US009192150B1

(12) United States Patent
Palmer

(10) Patent No.: US 9,192,150 B1
(45) Date of Patent: Nov. 24, 2015

(54) BAIT FISH HOLDER DEVICE

(76) Inventor: Curtis Palmer, Roseburg, OR (US)

( * ) Notice: Subject to any disclaimer, the term of this patent is extended or adjusted under 35 U.S.C. 154(b) by 852 days.

(21) Appl. No.: 12/799,128

(22) Filed: Apr. 19, 2010

(51) Int. Cl.
*A01K 85/12* (2006.01)
*A01K 83/06* (2006.01)
*A01K 91/08* (2006.01)
*A01K 85/00* (2006.01)

(52) U.S. Cl.
CPC .............. *A01K 85/12* (2013.01); *A01K 83/06* (2013.01); *A01K 85/00* (2013.01); *A01K 91/08* (2013.01)

(58) Field of Classification Search
CPC ....... A01K 85/00; A01K 85/10; A01K 85/12; A01K 83/06; A01K 91/08
USPC ......... 43/44.2, 44.4, 44.6, 44.8, 42.11, 42.13, 43/42.14, 42.15, 42.16, 42.17, 42.18, 43/42.19, 42.2, 42.21, 43.13, 4.5; D22/126, 129, 130, 131, 125
See application file for complete search history.

(56) References Cited

U.S. PATENT DOCUMENTS

| | | | | |
|---|---|---|---|---|
| 315,967 | A * | 4/1885 | Spencer | 43/42.2 |
| 339,952 | A * | 4/1886 | Wakeman | 43/44.4 |
| 496,441 | A * | 5/1893 | Pepper, Jr. | 43/42.2 |
| 580,915 | A * | 4/1897 | Welch | 43/44.2 |
| 849,036 | A * | 4/1907 | Zimmerman | 43/42.2 |
| 885,642 | A * | 4/1908 | Osterhout | 43/44.2 |
| 1,451,436 | A * | 4/1923 | Barnia | 43/42.21 |
| 1,573,288 | A * | 2/1926 | Wilson | 43/42.2 |
| 1,731,161 | A * | 10/1929 | Farley | 43/42.13 |
| 1,804,391 | A * | 5/1931 | Abrahams | 43/42.2 |
| 2,003,550 | A * | 6/1935 | Muller | 43/42.36 |
| 2,010,598 | A * | 8/1935 | Leighton | 43/44.6 |
| 2,012,786 | A * | 8/1935 | Hoage | 43/44.4 |
| 2,157,333 | A * | 5/1939 | Hadaway | 43/44.2 |
| 2,196,508 | A * | 4/1940 | Steinhoff | 43/42.36 |
| 2,261,433 | A * | 11/1941 | Demory | 43/42.2 |
| 2,467,971 | A * | 4/1949 | Frair | 43/44.2 |
| 2,502,879 | A * | 4/1950 | Nikander | 43/42.08 |
| 2,516,039 | A * | 7/1950 | Wysack | 43/42.36 |
| 2,518,593 | A * | 8/1950 | Bell | 43/44.2 |
| 2,565,049 | A * | 8/1951 | Sisco | 43/42.13 |
| 2,599,128 | A * | 6/1952 | Roberts | 43/43.14 |
| 2,791,059 | A * | 5/1957 | Holmberg | 43/44.2 |
| 2,792,661 | A * | 5/1957 | Denby | 43/42.16 |
| 2,795,886 | A * | 6/1957 | Johnson | 43/44.2 |
| 2,836,922 | A * | 6/1958 | Cox | 43/44.2 |
| D197,469 | S * | 2/1964 | Wiswald | D22/129 |
| 3,197,911 | A * | 8/1965 | Rolfsness et al. | 43/44.2 |
| 3,529,376 | A * | 9/1970 | Parmeson | 43/42.16 |
| 3,645,031 | A * | 2/1972 | Egles | 43/44.2 |
| 3,940,871 | A * | 3/1976 | Evans | 43/43.13 |
| 4,201,008 | A * | 5/1980 | Sparkman | 43/42.2 |
| 4,422,260 | A * | 12/1983 | Perrick | 43/44.2 |
| 4,510,710 | A * | 4/1985 | Hanna et al. | 43/42.2 |
| 4,850,132 | A * | 7/1989 | Motyka | 43/44.2 |
| 4,869,014 | A * | 9/1989 | Francklyn | 43/44.6 |
| 4,976,061 | A * | 12/1990 | Pool | 43/44.6 |
| 5,063,705 | A * | 11/1991 | Pool | 43/44.6 |
| 5,177,895 | A * | 1/1993 | Baron | 43/44.2 |

(Continued)

FOREIGN PATENT DOCUMENTS

FR 2790362 A1 * 9/2000 ............. A01K 85/12

*Primary Examiner* — Darren W Ark
(74) *Attorney, Agent, or Firm* — Howard Eisenberg, Esq.

(57) ABSTRACT

A device for imparting rotational or oscillatory motion to a bait fish in order to entice a game fish to bite the bait fish, which device is primarily connected to the bait fish within the mouth of the bait fish.

16 Claims, 3 Drawing Sheets

(56) References Cited

U.S. PATENT DOCUMENTS

| | | | |
|---|---|---|---|
| 5,303,497 A * | 4/1994 | Rabideau | 43/42.21 |
| 5,377,442 A * | 1/1995 | Gariglio | 43/44.4 |
| 5,505,016 A * | 4/1996 | Baron | 43/44.2 |
| 5,564,218 A * | 10/1996 | Kato | 43/42.19 |
| 5,778,593 A * | 7/1998 | Baron | 43/44.4 |
| 5,893,232 A * | 4/1999 | Horton et al. | 43/44.4 |
| 6,516,552 B2 * | 2/2003 | Hawkins | 43/44.2 |
| 6,658,785 B1 * | 12/2003 | Faulkner et al. | 43/44.6 |
| 6,708,442 B2 * | 3/2004 | Kress et al. | 43/44.4 |
| 7,257,923 B1 * | 8/2007 | Urbano, Jr. | 43/44.2 |
| 7,908,787 B2 * | 3/2011 | Finley | 43/44.8 |
| 8,024,887 B2 * | 9/2011 | Milanowski | 43/44.2 |
| 8,943,737 B1 * | 2/2015 | Palmer | A01K 85/12 43/4.5 |
| 2009/0100737 A1 * | 4/2009 | Hunter | 43/44.4 |
| 2009/0126256 A1 * | 5/2009 | Gregory | 43/42.2 |

\* cited by examiner

BAIT FISH HOLDER DEVICE

FIELD OF THE INVENTION

The present invention pertains to the field of using a bait fish as a fishing lure, and more particularly to the field of utilizing a bait fish holder that causes a bait fish to rotate or oscillate in water during trolling.

BACKGROUND OF THE INVENTION

Fishing lures utilizing bait fish are well known. It is also well known to utilize a bait fish holder that includes one or more lateral projections that cause a bait fish to rotate or oscillate when pulled through water during trolling. The following patents disclose bait fish holders that include such lateral projections.

Baron, U.S. Pat. No. 5,177,895; Bell, U.S. Pat. No. 2,518,593; Egles, U.S. Pat. No. 3,645,031; Faulkner, U.S. Pat. No. 6,658,785; Holmberg, U.S. Pat. No. 2,791,059; Horton, U.S. Pat. No. 5,893,232; Kress, U.S. Pat. No. 6,708,442; Rolfsness, U.S. Pat. No. 3,197,911; Urbano. U.S. Pat. No. 7,257,923; and Wakeman, U.S. Pat. No. 339,952.

The bait fish holders disclosed in each of these patents are primarily attached to the bait fish by a device that is external to the bait fish, such as a cap, cone, clamp, or cage. Therefore, the rotational force due to movement of the bait fish holder through the water is externally imparted to the fish.

The disadvantage that results from the external attachment of the bait fish holder to the bait fish is that the bait fish is presented to game fish in a manner that is less than ideal because the rotation of the bait fish is not natural and the external device itself obscures the bait fish and gives it an unnatural appearance.

The present invention, disclosed in detail below, provides a solution to the disadvantages of the prior art.

DESCRIPTION OF THE INVENTION

The inventor has discovered that the rotational or oscillatory movement of a bait fish is enhanced and presented in a more natural manner by attaching the bait fish to a bait fish holder by a predominately internal, rather than an external, communication.

Figure 1:
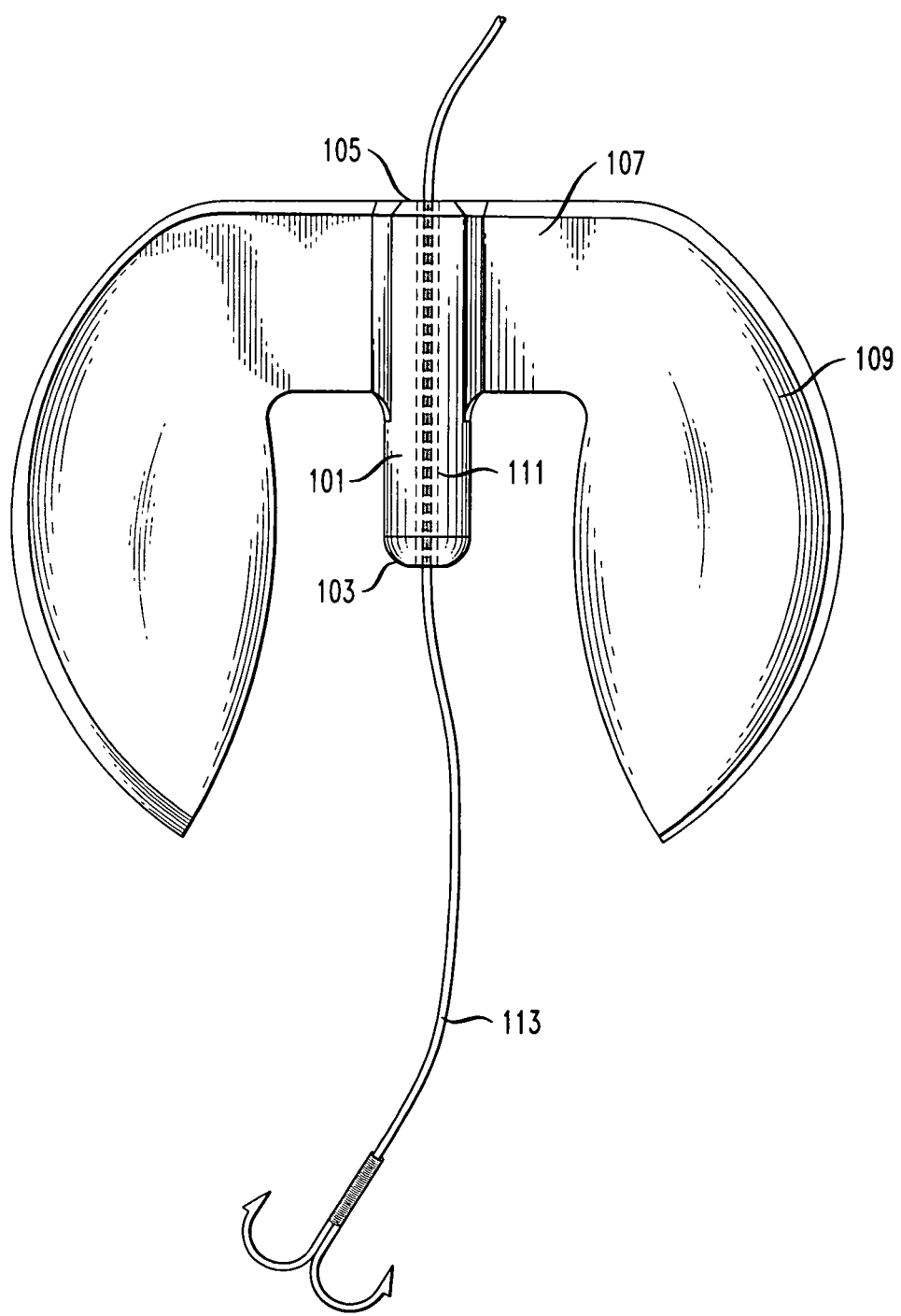
FIG. 1 is a diagrammatic representation of a preferred embodiment of the device.

Described herein is a device for imparting rotational or oscillatory movement to a bait fish, a preferred embodiment of which is shown diagrammatically in FIG. 1. According to this embodiment, the device includes a mouth-insertion plug 101 for insertion into the mouth of a bait fish, which plug preferably is cylindrical and which plug has a distal end 103 and a proximal end 105. The proximal end of the plug is connected to a plurality of arms 107 extending substantially radially outward from the plug. Each of the arms is connected to a blade 109. Preferably, the insertion plug 101 contains a fishing-line channel 111 that courses substantially axially through the plug and that allows the insertion of a fishing line 113 through the length of the plug. The device provides rotational or oscillatory motion to a fish by predominant purchase of the device to the interior of the mouth of the bait fish, rather than by predominant purchase to the exterior of the bait fish, as is the case with devices of the prior art.

The mouth-insertion plug is shaped and sized to fit within the mouth of a bait fish and to articulate with the internal tissues within the mouth, thus providing purchase to the interior of the mouth of the bait fish. The shape of the plug is preferably a round cylinder. However, other shapes such as a polygonal cylinder are also suitable. The plug may also be in the shape of a sphere, if desired.

Figure 2:
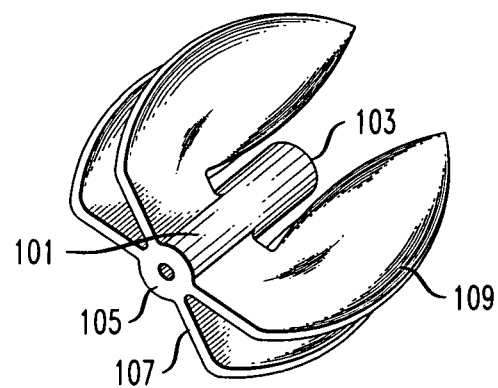
FIG. 2 is a diagrammatic representation of the device in which more than two arms are present.
Figure 3:
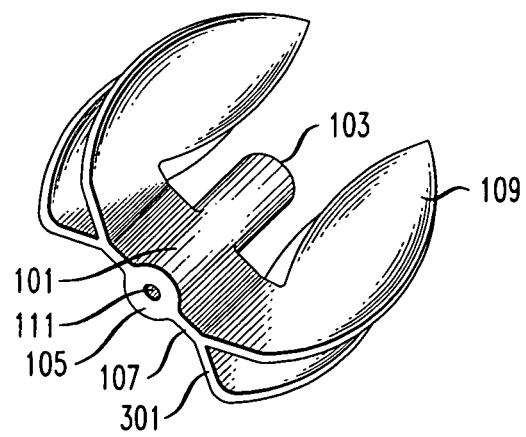
FIG. 3 is a diagrammatic representation of the device which the arms are compound.

The proximal end of the plug is preferably connected to a pair of arms that are preferably oriented 180° from each other on either side of the plug. If desired, additional arms, preferably paired, may be connected to the plug. For example, as shown in FIG. 2, four arms may be connected to the plug with the arms located at locations such as at 0°, 15°, 180°, and 195° measured radially around the plug. The arms may be simple, as shown in FIG. 1, or may be compound, as shown in FIG. 3. That is, the arms may branch to contain additional extensions 301.

The arms are connected to one or more blades that extend from the arm. Preferably, the blade extends from the arm in a direction that is essentially parallel to the axis of the plug. In this way, when the bait fish holder device is inserted into the mouth of a bait fish, the blades will be oriented in a direction that is essentially parallel to the body of the fish. If desired, the blades may extend in a direction that deviates from parallel to the axis of the plug. For example, the plug and the blades may be at an acute angle between 0° and 90° relative to each other. It is less preferred, but within the scope of the invention, that the plug and the blades are oriented at an obtuse angle relative to one another, that is between 90° and 180° or even 270° relative to one another.

In a preferred device, the plug contains a fishing-line channel oriented substantially axially through the plug to permit the insertion of a fishing line through the device. The fishing line may be connected to a hook. Alternatively, a hook may be attached to the bait fish independently of the device of this application or a fishing line may be connected in some other manner to the device, such as by means of a ring assembly attached to the proximal end of the plug. In one preferred device, the fishing-line channel is centered axially within the plug. In another preferred device, the fishing-line channel may be off-centered or may be angled through the plug. Situating the channel in an off-centered position or at an angle through the plug may increase the rotational motion of the bait fish that is imparted by the device.

Preferably, but not necessarily, the device is secured to the bait fish during fishing. This decreases the chance that the device will be pulled from the mouth of the fish by the pull of the line by a fisherman or by the action of a game fish. Securing the device to the bait fish also maximizes the transfer of rotational energy from the device to the bait fish.

Figure 4:
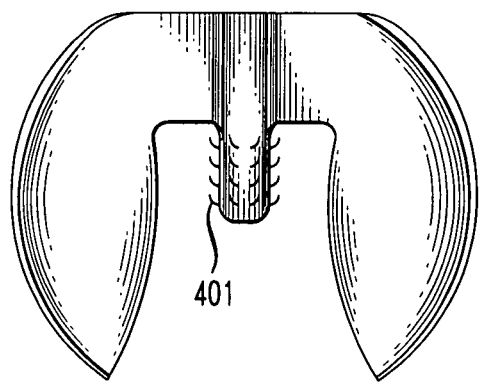
FIG. 4 is a diagrammatic representation of the device which includes barbs to secure the device to a bait fish.

The manner in which the device is secured to the bait fish is immaterial. For example, the fish may be secured to the device by the use of a wire that is wrapped around the open end of the mouth of the fish in order to secure the mouth to the device. As another example, the device may contain one or more orifices or grooves to facilitate the introduction of a wire or pin to hold the device in place. The device may also include one or more clamps located at the proximal end of the plug, on the arms, or on the blades to secure the device to the bait fish. The central plug of the device may contain external barbs 401, such as shown in FIG. 4, that serve to anchor the device in place within the mouth of the fish.

The shape and orientation of the blades may be varied depending on the desire of the user. The blades may be essentially linear or may have a complex geometrical shape, such as in a teardrop or curvilinear shape. The blades are preferably essentially planar or curved such as is found in a propeller or fan blade.

The device may be a unitary device and may be made by any method by which such devices may be made. The device may be made of any rigid material, such as a metal, a plastic, a ceramic, or a composite. Alternatively, the device may be other than a unitary device. For example, the plug section of the device may be made of one material, such as a plastic, and the arms and blades of the device may be made of a different material, such as a metal, or vice versa. In this alternative, the various sections of the device may be made separately and then joined together by any suitable method.

In another embodiment, the device is a fishing lure that includes a bait fish and the device described above which is inserted within the mouth of the fish. Preferably, the device is secured to the bait fish such as described above.

Figure 5:
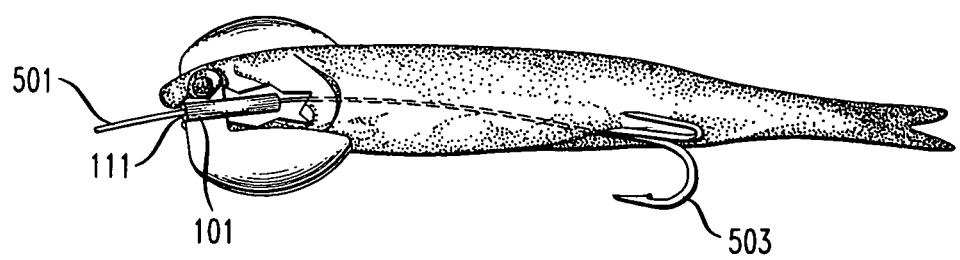
FIG. 5 is a diagrammatic representation showing the device in place in a bait fish.

The fishing lure further contains a hook connected to the fish or to the device. In a preferred embodiment as shown in FIG. 5, a fishing line 501 is situated within a fishing-line channel 111 oriented axially within the plug 101 of the device and a hook 503 is situated on the fishing line at its end that is oriented towards the distal side of the plug. In an alternative embodiment, the hook may be attached directly or indirectly to the fish or may be attached to the device by means other than by a fishing line situated within a channel within the plug.

The fishing line may be introduced into and through the body of a fish by introducing the line through the channel of the device and attaching a needle to the line, such as by a knot or a loop. The needle is inserted into the mouth of the fish and is pulled through the fish to exit the body of the fish in a desired location. A hook may then be attached to the line. Upon pulling the line from the direction of the device, the hook may be anchored in the body of the fish and the device may be situated and secured to the mouth of the fish as shown in FIG. 5.

Also described herein is a method for attaching a bait fish to a bait fish holder. According to this method, an individual inserts the distal end of the plug of the device described above and secures the device into the mouth of the fish.

Also described herein is a method for fishing. According to this method, an individual casts the fishing lure of the invention by means of a rod and reel into a body of water and causes the fishing lure to move through the water in an attempt to entice a fish within the body of water to strike the lure and, thereby, to catch the fish.

Further modifications, uses, and applications of the inventions described herein will be apparent to those skilled in the art. It is intended that such modifications be encompassed in the following claims.

The invention claimed is:

1. A device for imparting rotational or oscillatory movement to a bait fish comprising a mouth-insertion plug for insertion between the lips and into the mouth of the bait fish, the plug has a distal end and a proximal end defining a longitudinal axis therebetween, a multiplicity of arms immovably connected to and extending outward from the plug, wherein the distal end of the plug extends beyond the connection of the arms to the plug, and one or more blades having proximal and distal ends and inner and outer edges connected to the arms so that the blades are held in a spaced relationship to the plug, wherein the outer edge of the one or more blades is spaced a greater distance from the longitudinal axis of the plug than the inner edge in a direction which is transverse to the longitudinal axis of the plug, wherein the one or more blades extend in a direction that is essentially parallel to the longitudinal axis of the plug and the distal end of the one or more blades extends beyond the distal end of the plug, wherein the connection of the outer edge of the one or more blades and the arms forms a distinct angle, and wherein the multiplicity of arms each have a forward edge extending from the plug to the outer edge of the respective blade of the one or more blades such that at least portions of the forward edges disposed on opposing sides of the plug are aligned with each other.

2. The device of claim 1 wherein the plug is cylindrical.

3. The device of claim 1 which further comprises a channel within the plug extending from the proximal to the distal end of the plug.

4. A fishing lure comprising a bait fish having a mouth and a device for imparting rotational or oscillatory movement to a bait fish, the device comprises a mouth-insertion plug for insertion between the lips and into the mouth of the bait fish, the plug has distal and proximal ends defining a longitudinal axis therebetween, a multiplicity of arms immovably connected to and extending outward from the plug, wherein the distal end of the plug extends beyond the connection of the arms to the plug, and one or more blades having proximal and distal ends and an inner and outer edge connected to the arms so that the one or more blades are held in a spaced relationship to the plug, wherein the outer edge of the one or more blades is spaced a greater distance from the longitudinal axis of the plug than the inner edge in a direction which is transverse to the longitudinal axis of the plug, wherein the one or more blades extend in a direction that is essentially parallel to the longitudinal axis of the plug and the distal end of the one or more blades extend beyond the distal end of the plug, and wherein the connection of the outer edge of the one or more blades and the arms forms a distinct angle, wherein the multiplicity of arms each have a forward edge extending from the plug to the outer edge of the respective blade of the one or more blades such that at least portions of the forward edges disposed on opposing sides of the plug are aligned with each other, and wherein the mouth of the fish has an orifice and two sides, and wherein the distal end of the plug device is secured within the orifice of the mouth of the bait fish and wherein the spaced relationship of the blades and the plug accommodates the sides of the mouth of the bait fish.

5. The fishing lure of claim 4 wherein the plug is cylindrical.

6. The fishing lure of claim 4 wherein the device further comprises a channel within the plug extending from the proximal to the distal end of the plug.

7. The fishing lure of claim 4 which further comprises a hook attached to the bait fish or to the device.

8. A method for attaching a bait fish to a bait fish holder comprising providing a device for imparting rotational or oscillatory movement to a bait fish, the device comprises a mouth-insertion plug for insertion between the lips and into the mouth of the bait fish, the plug has distal and proximal ends defining a longitudinal axis therebetween, a multiplicity of arms immovably connected to and extending outward from the plug, wherein the distal end of the plug extends beyond the connection of the arms to the plug, and one or more blades having an inner and outer edge connected to the arms in a spaced relationship of the blades and the plug wherein the outer edge of the one or more blades is spaced a greater distance from the longitudinal axis of the plug, and extending beyond the distal end of the plug in a direction that is essentially parallel to the longitudinal axis of the plug, and wherein the connection of the one or more blades and arms forms a distinct angle, and inserting the distal end of the plug of the device between the lips and into the mouth of the bait fish, wherein the one or more blades extend along the body of the fish and the spaced relationship of the blades and the plug accommodates the sides of the mouth of the bait fish.

9. The method of claim 8 which further comprises securing the device to the bait fish.

10. The method of claim 8 wherein the plug is cylindrical.

11. The method of claim 8 wherein the device further comprises a channel within the plug extending from the proximal to the distal end of the plug.

12. The method of claim 8 wherein the device further comprises a hook attached to the bait fish or to the device.

13. A method for fishing comprising trolling a fishing lure comprising a bait fish having a mouth and a device for imparting rotational or oscillatory movement to a bait fish which device comprises a mouth-insertion plug for insertion between the lips and into the mouth of the bait fish, which plug has distal and proximal ends defining a longitudinal axis therebetween, a multiplicity of arms immovably connected to and extending outward from the plug, wherein the distal end of the plug extends beyond the connection of the arms to the plug, and one or more blades having an inner and outer edge connected to the arms so that the one or more blades is held in a spaced relationship to the plug, wherein the outer edge of the one or more blades is spaced a greater distance from the longitudinal axis of the plug than the inner edge in a direction that is transverse to the longitudinal axis of the plug, and extend in a direction that is essentially parallel to the longitudinal axis of the plug and extend beyond the distal end of the plug, wherein the connection of the outer edge of the one or more blades and the arms forms a distinct angle, wherein the plug is inserted between the lips and into the mouth of the bait fish and wherein the one or more blades extend along the body of the bait fish and the spaced relationship between the one or more blades and the plug accommodates the sides of the mouth of the bait fish, and placing the fishing lure into a body of water and causing the lure to move through the water.

14. The method of claim 13 wherein the plug is cylindrical.

15. The method of claim 13 wherein the device further comprises a channel within the plug extending from the proximal to the distal end of the plug.

16. The method of claim 13 wherein the device further comprises a hook attached to the bait fish or to the device.

\* \* \* \* \*